(12) United States Patent
Bauer

(10) Patent No.: US 8,783,067 B2
(45) Date of Patent: Jul. 22, 2014

(54) USE OF PRE-REACTED CEMENTS AS RAW MATERIAL FOR GLASS PRODUCTION AND THE MANUFACTURE OF FIBER THEREFROM

(75) Inventor: Jon Frederick Bauer, Castle Rock, CO (US)

(73) Assignee: Johns Manville, Denver, CO (US)

( * ) Notice: Subject to any disclaimer, the term of this patent is extended or adjusted under 35 U.S.C. 154(b) by 2005 days.

(21) Appl. No.: 11/451,811

(22) Filed: Jun. 13, 2006

(65) Prior Publication Data

US 2007/0284781 A1 Dec. 13, 2007

(51) Int. Cl.
*C03B 1/02* (2006.01)
*C03B 3/02* (2006.01)

(52) U.S. Cl.
USPC .............. 65/136.1; 65/33.7; 65/66; 65/135.9

(58) Field of Classification Search
USPC ............. 65/135.9, 66, 33.7, 136.1; 264/297.9
See application file for complete search history.

(56) References Cited

U.S. PATENT DOCUMENTS

| | | | | |
|---|---|---|---|---|
| 4,188,228 A | * | 2/1980 | Brzozowski | 501/29 |
| 4,298,369 A | * | 11/1981 | Froberg et al. | 65/27 |
| 4,347,073 A | * | 8/1982 | Aubourg et al. | 65/28 |
| 4,358,304 A | * | 11/1982 | Froberg | 65/27 |
| 6,009,724 A | * | 1/2000 | Helsen et al. | 65/17.3 |

* cited by examiner

*Primary Examiner* — Joseph S Del Sole
*Assistant Examiner* — Russell Kemmerle, III
(74) *Attorney, Agent, or Firm* — Robert D. Touslee

(57) ABSTRACT

The subject invention is directed to a method for producing a pre-reacted clinker used in the manufacture of E glass. The clinker is fed into an E glass furnace, and melts down into a finished E glass product at high efficiencies and short production times. The clinker allows glass to be produced at a lower cost as compared with known methods.

17 Claims, 2 Drawing Sheets

# USE OF PRE-REACTED CEMENTS AS RAW MATERIAL FOR GLASS PRODUCTION AND THE MANUFACTURE OF FIBER THEREFROM

TECHNICAL FIELD

The invention relates to a method for producing a pre-reacted clinker or pellet used in the production of continuous filament glass fibers. The clinker is formed by pre-mixing raw ingredients typically used to manufacture glass and heating the mixture and forming the mixture into a pellet or clinker. The raw materials is also be pre-reacted by heating so as to remove undesirable components from the mixture and to initiate the reaction of the raw materials. The clinker can then be fed to a glass furnace, where it is formed into a homogenous melt from which glass fibers may be drawn. The method allows for production of high-quality glass using less energy than is used with known methods.

BACKGROUND OF THE INVENTION

Conventional manufacturing of continuous glass filament involves a continuous, integrated process in which combinations of mineral raw ingredients are blended and fed into large furnaces where they are melted, conditioned, and eventually delivered to multi-hole bushings from which fibers are drawn. Typical raw ingredients include limestone ($CaCO_3$) and quartz sand ($SiO_2$). In the glass furnace limestone first decomposes to form lime (CaO). The lime then reacts with quartz sand to form calcium silicates such as calcium meta-silicate ($CaSiO_3$). In addition, clays such as kaolin, are typically used as a source of aluminum as well as silicate. The clays typically used contain significant amounts of water which must be removed before the aluminum and silica can react.

To produce a high quality glass melt of sufficient homogeneity for high-efficiency fiber production, it is necessary that sufficient mixing of the various batch components, melting of those components, and mixing of the produced melt be allowed to occur. This can prove difficult using current technology, particularly at high throughputs and production rates.

One major problem with current technology is that glass furnaces do not do an efficient job of blending and mixing glass raw ingredients. Current technology thus requires long residence times and consumes significant amounts of energy, both of which substantially increase the cost of producing continuous glass fibers.

Further, carbon dioxide and other volatile materials form in the glass furnace from the decomposition of raw ingredients such as limestone and borates. This creates a troublesome foam within the glass furnace that increases the energy requires to form a homogeneous glass melt.

It would be desirable to provide a method for producing glass that does not require that the mixing of raw ingredients and the melting down of ingredients into a homogeneous melt occur simultaneously. It would also be desirable to provide a method in which decomposition of limestone occurs outside the glass furnace such that the volatile foam discussed above does not form within the glass furnace.

BRIEF SUMMARY OF THE INVENTION

The present invention is directed to a system and method which produces a pre-reacted pellet or "clinker" to be fed into an glass furnace in the production of glass fibers. In one embodiment, the clinker is produced by feeding conventional glass raw ingredients into a vessel such as, for example, a rotary kiln. The raw materials are heated in the vessel to form the clinker. The heating of the raw materials drives off unwanted components of the raw material such as carbonates and water and, in one embodiment, cause the raw materials to react with each other. The pellet formation and pre-reaction of the raw materials allows for a shorter residence time in the glass furnace than is required by current technology, which feeds unreacted raw ingredients directly into the glass furnace. It also prevents the formation of undesirable material within the glass furnace that results in higher energy costs and lower glass quality.

In this method, conventional glass raw materials are mixed and pre-reacted prior to being fed into an glass furnace. This reduces residence time and energy required to form a homogenous melt within the glass furnace. It also reduces or eliminates the generation of troublesome foams that typically form within the glass furnace as a result of the decomposition of limestone and other materials. This allows for a more efficient use of energy in the glass furnace, which results in a cost-effective production of a homogeneous glass melt as compared to current methods.

In one embodiment, the pellets or clinkers are formed at the same time the raw materials are pre-reacted. In one alternate embodiment, the clinkers are formed first and then heated to pre-react the raw materials.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The invention relates to an improvement in the process used to manufacture glass. More specifically, the invention relates to a method for producing a pre-reacted clinker or pellet that is fed into a glass furnace. The method allows for the production of high-quality glass using less energy than is used with known methods.

Figure 1:
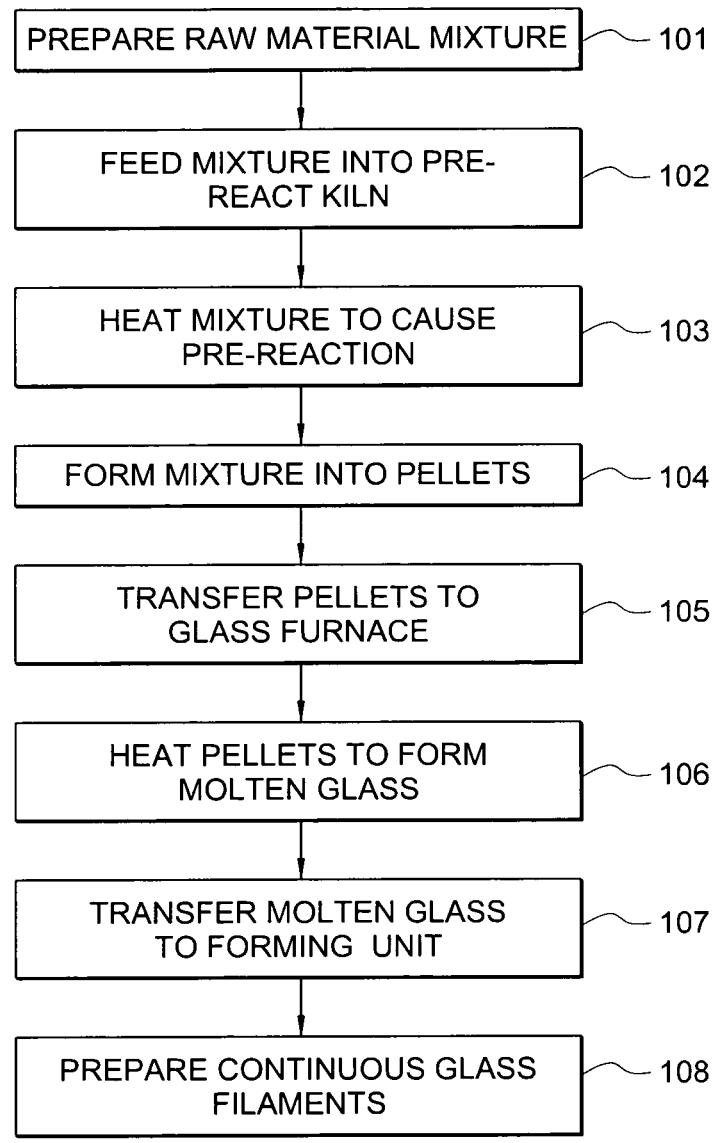
FIG. 1 is a schematic showing one embodiment of the invention.

Referring to FIG. 1, a first embodiment of the invention is described. In this embodiment, a mixture of raw materials is prepared 101. This step can be found at length in the materials are introduced into the pre-react kiln or after the raw material entered the kiln. In the former case, the raw material mixture is then transferred into the pre-react kiln 102. Once the material is in the kiln, the mixture is heated to a temperature sufficient to cause pre-reaction of the mixture 103. the temperature typically used ranges from about 900° C. to about 1250° C. for a period of from about 1 to about 24 hours. At these temperatures, undesirable components such as carbonates and water, are driven out of the mixture. In addition, the silica, calcium and aluminum containing compositions begin to react to form a glass percussion. The raw materials typically comprise one or more silica containing materials such as quartz, one or more calcium containing materials such as limestone ($CaCO_3$) and one or more aluminum containing materials such as clays like kaolin. Additional raw material such as fluxes (e.g. borates), magnesium containing materials, sodium containing materials and sulphur containing material may be added to the raw material mix during the pre-react phase or may be introduced just before the pre-reacted materials are introduced into the glass furnace.

In this embodiment, the pellets or clinkers are formed in the pre-react oven. This can be accomplished in several ways. First, the pre-react oven can be a rotary kiln. In this embodiment, the rotation of the kiln both mixes the raw materials and causes the material to form small pellets or clinkers as the material passes through the kiln.

After the pellets are formed and the raw material mixture has pre-reacted, the pellets are transferred to the glass furnace 105. In the furnace, the pellets are heated to the point whence molten glass is formed 106. Once the molten glass is formed, it is transferred to the forming equipment 107 where it is shaped 108. In this embodiment, it is spun into continuous glass fibers 108.

In an alternative embodiment, the raw materials are fed into a fluidized bed which can be vertical or horizontal in nature. In this embodiment, the raw materials are fed into the reactor forming a bed of materials. Hot gases are introduced into the oven at sufficient velocity to "fluidize" the bed of raw materials. The heat from the hot gases cause the undesirable components to be driven off and causes the raw material to pre-react. In addition, as the raw material particles collide with each other, the formed agglomerates continue to grow until they reach a density where the force of the hot gases is no longer sufficient to keep the agglomerate suspended. At this point, the agglomerates or pellets fall out of the bed. They are then removed from the oven and transferred to the glass furnace.

Figure 2:
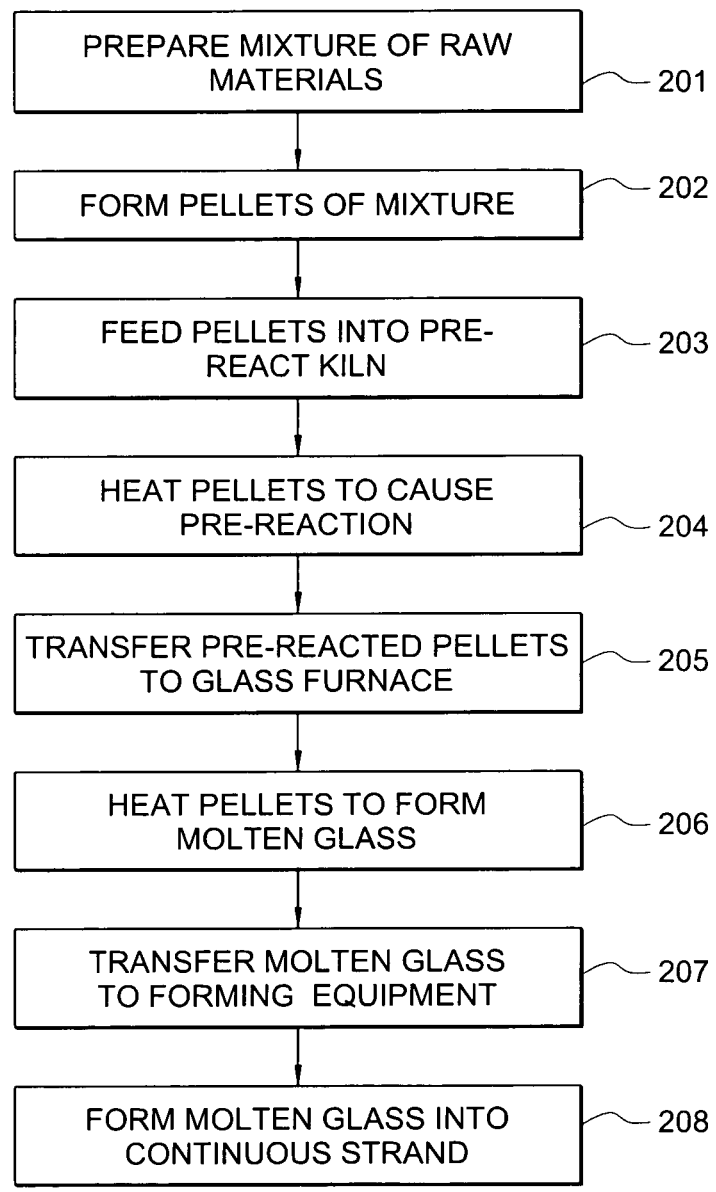
FIG. 2 is a schematic showing an alternate embodiment of the invention.

In yet another embodiment shown in FIG. 2, the pellets are formed prior to the pre-reaction step 201. In this embodiment, the raw materials are shaped into pellets using standard equipment such as a rotary pelletizer. A raw material mixture is prepared 201 and the raw material mixture is fed into the pelletizer along with sufficient water to cause the materials to aggregate into discrete particle or pellets 202. Also a binder may be added to aid in the formation of the particles. The unreacted "green" pellets are then fed into a pre-react oven 203 and heated as described above to pre-react the materials 204. The renewing steps 205-208 are the same as steps 105-108.

In both of these embodiments described above, the pre-reacted pellets are then transferred to a glass furnace where they are melted to form a molten glass. The molten glass is then transferred into a form where the glass is shaped into continuous filaments.

The pre-react oven is generally heated at a temperature of from 900° C. to about 1250° C. for a period of from about 1 to about 24 hours. The temperature and time used will depend, in part, on the degree of pre-reaction desired. Shorter terms and lower temperatures will cause less of the material to pre-react. In general, the time and temperature used should be sufficient to at least remove substantially all of the carbonate and water present in the mixture and to allow the raw materials to agglomerate. Thus higher temperatures and/or longer residence time.

One skilled in the art would appreciate optimum clinker compositions depending on desired results. Generally, suitable composition ranges for glass clinker will result in a mixture with the overall compositional values shown in Table 1:

TABLE 1

Table 1. Suitable composition ranges for glass clinker.

| | Wt % Oxide |
|---|---|
| $SiO_2$ | 20-65 |
| $Al_2O_3$ | 13-50 |
| CaO | 20-50 |
| $B_2O_3$ | 0-8 |
| $Na_2O$ | 0-10 |
| MgO | 0-5 |
| $SO_3$ | 0-2 |

A key advantage of the current invention over existing technology is that pre-reaction vessels such as rotary kilns can achieve a more uniform blend or mixture of raw materials as compared to typical glass furnaces. Further, carbon dioxide, water vapor and other volatile generation from decomposition of limestone or borates is completely segregated from the melting operation. This means that troublesome foam generation in the furnaces is eliminated and they can operate with less energy consumed. Another advantage is that clinker can be designed in a form that will very readily break down in the furnace to form a melt near or at the E glass composition.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

EXAMPLE 1

A simple glass "clinker" was prepared by intimately blending equal molar amounts of 200 mesh limestone and 325 mesh quartz (37.5 wt % $SiO_2$, 62.5 wt % $CaCO_3$) and placing into a vitreous silica crucible. The crucible was heated to 1000 C for four hours, removed and then cooled to room temperature. The calcined batch was removed from the crucible and analyzed by x-ray diffraction to determine the identity of the crystalline phases present and their approximate amounts. The material was further crushed to a particle size of 150 mesh, suitable for delivery to a glass furnace, and evaluated by optical and scanning electron microscopy to determine the physical makeup of each particle and the form of the individual components comprising the particles.

Results from x-ray diffraction indicated that, predictably, all of the limestone had decomposed to form lime (CaO), the carbonate component being driven off as carbon dioxide. Although, much of the quartz remained unreacted, up to 5 wt % of it did react with the lime to form a mixture of wollastonite ($CaSiO_3$) and larnite ($Ca_2SiO_4$). Microscopical analysis of the crushed pellets indicated that in addition to forming a small amount of new calcium silicate phases, the "clinkering" reaction produced a densification of the quartz and lime particles, bringing them into more intimate contact than would have occurred if they were left as a mixed batch material typical of conventional furnace feedstock. Each particle then consisted of a densified mixture of quartz, lime, and pre-reacted calcium silicates, i.e., in a more reactive form for delivery to the glass furnace. The clinker thus produced contains no water or carbonate, so energy to melt in the furnace is correspondingly lowered and troublesome foam-forming reactions due to generation of carbon dioxide and water are reduced as well.

EXAMPLE 2

A more complex glass "clinker" was prepared by blending equimolar amounts of limestone and quartz as described in Example 1 together with a small amount of borax (sodium borate) to produce a bulk composition with the chemistry 50.9 wt % $SiO_2$, 47.5 wt % CaO, 1.3 wt % $B_2O_3$ and 0.4 wt % $Na_2O$ as defined within the compositional boundaries of Table 1. This mixture was then heated to 1000° C. for four hours as done previously, removed and cooled to room temperature. The calcined batch was then removed, crushed and analyzed as described in the previous example.

X-ray diffraction results showed that in this example, over 50% of the quartz had reacted to form a mixture of calcium ortho and metasilicates (larnite and wollastonite). In addition some of the lime had reached with the borax to form a calcium borate ($Ca_3B_2O_6$). Lime (from decomposition of limestone as in Example 1) and residual quartz comprised the remainder of the batch. Microscopial analysis of the crushed pellets showed an even greater densification of the quartz and lime particles than seen in Example 1. This was enhanced by intergrowth of the calcium silicates that formed intergranular phases which bonded the lime and quartz particles together. In this case, not only were the calcium and silica source particles (lime and quartz) in very close contact, but they had formed extensive chemical reactions of a type similar to those brought about in the glass furnace. This pre-reaction of calcium and silica and of calcium and boron oxides illustrates the desirable reactions described in this invention.

An aluminosilicate glass "clinker" was prepared by blending limestone and quartz as described in Examples 1 and 2 together with 325 mesh kaolin clay, borax, and boric acid to produce a bulk composition with the chemistry 55.1 wt % $SiO_2$, 13.5 wt % $Al_2O_3$, 24.4 wt % CaO, 5 wt % $B_2O_3$, and 2% $Na_2O$ as defined within the compositional boundaries of Table 1. This mixture was then heated to 1050° C. for four hours, removed and cooled to room temperature. The calcined batch was then removed, crushed and analyzed as described in the previous example.

X-ray diffraction results showed extensive reaction among the various components. In this example, over 75% of the quartz had reacted with the lime to form calcium metasilicate (wollastonite) as seen in Examples 1 and 2, and with the clay to form calcium aluminum silicate (anorthite). No residual lime remained. Further microscopical analysis revealed that these reactions had also produced an extensive amorphous phase (early-formed melt) that wetted and coated the residual quartz and newly-formed silicate phases in such a way that the pellets produced were quite dense. Each quartz grain was in intimate contact with either the silicate or aluminosilicate crystalline phases or with the amorphous phase in a manner which illustrates the desirable reactions described in this invention. The pellets produced constitute a fully pre-reacted batch as all the ingredients necessary to for the desired glass composition are present.

What is claimed is:

1. A method for preparing a pre-reacted pellet for the formation of glass fibers comprising:
   feeding raw materials into a pre-react kiln;
   heating said raw materials at a temperature of from 900° C. to about 1250° C. for a period of from about 1 to about 24 hours so as to remove carbonates from said raw materials; and
   forming said raw materials into a pellet.

2. The method of claim 1 wherein said pre-react kiln comprises a rotary kiln.

3. The method of claim 1 wherein said pre-react kiln comprises a fluidized bed kiln.

4. The method of claim 1 wherein said raw materials comprise quartz, limestone and clay.

5. A method for preparing a pre-reacted pellet for the production of glass comprising:
   preparing a mixture of raw materials;
   forming the mixture of raw materials into pellets; and
   heating the pellets in a pre-react kiln at a temperature of from 900° C. to about 1250° C. for a period of from about 1 to about 24 hours to remove carbonates from the raw materials.

6. The method of claim 5 wherein the pellets are formed in a pelletizer.

7. The method of claim 5 wherein said raw materials comprise a silica containing material, an aluminum containing material and a calcium containing material.

8. The method of claim 7 wherein said silica containing material comprises quartz.

9. The method of claim 7 wherein said calcium containing material comprises calcium carbonate.

10. The method of claim 7 wherein the aluminum containing material comprises clay.

11. The method of claim 5 wherein said pre-react kiln comprises a rotary kiln.

12. The method of claim 5 wherein said pre-react kiln comprises a fluidized bed kiln.

13. A method for preparing glass comprising:
   forming a raw material mixture;
   heating the mixture at a temperature of from 900° C. to about 1250° C. for a period of from about 1 to about 24 hours such that carbonates are removed from at least a portion of said raw materials;
   forming said raw material mixture into pellets;
   melting said pellets to form a molten glass; and
   forming said molten glass into a glass product.

14. The method of claim 13 wherein said raw materials comprise:

a silica containing material;
a calcium containing material; and
an aluminum containing material.

15. The method of claim 13 wherein said heating is performed in a rotary kiln.

16. The method of claim 13 wherein said heating is performed in a fluidized bed kiln.

17. The method of claim 13 wherein said glass product is a continuous glass filament.

* * * * *